United States Patent
Wen et al.

(10) Patent No.: US 10,616,046 B2
(45) Date of Patent: Apr. 7, 2020

(54) SYSTEM AND METHOD OF HANDLING A FAULT DETECTION MECHANISM DURING A CONTROL PLANE FAILOVER

(71) Applicant: Arista Networks, Inc., Santa Clara, CA (US)

(72) Inventors: Victor Shih-Hua Wen, San Jose, CA (US); Kenneth Joseph Blanc, Westford, MA (US); Adam James Sweeney, San Jose, CA (US); Saravanan Sellappa, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/640,256

(22) Filed: Jun. 30, 2017

(65) Prior Publication Data
US 2019/0007260 A1   Jan. 3, 2019
US 2020/0044913 A9   Feb. 6, 2020

Related U.S. Application Data

(60) Provisional application No. 62/477,989, filed on Mar. 28, 2017.

(51) Int. Cl.
*H04L 12/24* (2006.01)
*H04L 29/12* (2006.01)
(Continued)

(52) U.S. Cl.
CPC .......... *H04L 41/0668* (2013.01); *H04L 41/08* (2013.01); *G06F 11/2023* (2013.01);
(Continued)

(58) Field of Classification Search
CPC ... H04L 41/0668; H04L 41/08; H04L 61/103; G06F 11/2023
See application file for complete search history.

(56) References Cited

U.S. PATENT DOCUMENTS

| 7,561,527 B1 * | 7/2009 | Katz ....................... H04L 43/50 370/241 |
| 2003/0145253 A1 * | 7/2003 | de Bonet ............ G06F 11/1438 714/38.13 |

(Continued)

OTHER PUBLICATIONS

Request for Comments 7130, "Bidirectional Forwarding Detection (BFD) on Link Aggregation Group (LAG) Interfaces"; Bhatia et al.; Feb. 2014. (Year: 2014).*

(Continued)

*Primary Examiner* — Benjamin H Elliott, IV
(74) *Attorney, Agent, or Firm* — Haley Guiliano LLP

(57) ABSTRACT

A method and apparatus of a network element that configures a fault detection service is described. In an exemplary embodiment, the network element starts a fault detection service for the link on each of a first supervisor and a second supervisor of the network element. In addition, the first supervisor is active and the second supervisor is standby. The network element further saves a state for the fault detection service of the second supervisor. The network element additionally, and in response to a failover from the first supervisor to the second supervisor, continues the fault detection service of the second supervisor, wherein this fault detection service is active and sends fault detection packets on the link.

23 Claims, 12 Drawing Sheets

(51) Int. Cl.
*G06F 11/20* (2006.01)
*H04L 12/26* (2006.01)

(52) U.S. Cl.
CPC ...... *H04L 41/0823* (2013.01); *H04L 41/0846* (2013.01); *H04L 43/0811* (2013.01); *H04L 61/103* (2013.01)

(56) References Cited

U.S. PATENT DOCUMENTS

| | | | |
|---|---|---|---|
| 2006/0209685 A1* | 9/2006 | Rahman | H04L 43/50 370/229 |
| 2013/0138832 A1* | 5/2013 | Qi | H04L 45/66 709/238 |
| 2014/0078887 A1* | 3/2014 | Yu | H04L 43/0811 370/219 |
| 2015/0381324 A1* | 12/2015 | Mirsky | H04L 1/24 370/241.1 |
| 2017/0155577 A1* | 6/2017 | Zhang | H04L 12/4641 |
| 2017/0288946 A1* | 10/2017 | Thomas | H04L 41/0654 |
| 2018/0278577 A1* | 9/2018 | Chandrashekhar | H04L 61/6022 |
| 2019/0007260 A1* | 1/2019 | Wen | H04L 41/0668 |

OTHER PUBLICATIONS

U.S. Appl. No. 15/640,259, filed Jun. 30, 2017, Victor Shih-Hua Wen.

* cited by examiner

SYSTEM AND METHOD OF HANDLING A FAULT DETECTION MECHANISM DURING A CONTROL PLANE FAILOVER

RELATED APPLICATIONS

Applicant claims the benefit of priority of prior, provisional application Ser. No. 62/477,989, filed Mar. 28, 2017, the entirety of which is incorporated by reference.

FIELD OF INVENTION

This invention relates generally to data networking, and more particularly, to handling a link fault detection mechanism during a failover of supervisors in a control plane of a network element.

BACKGROUND OF THE INVENTION

Bidirectional Forwarding Detection (BFD) is a network protocol used to detect faults between two network elements connected by a link. BFD provides low-overhead detection of faults even on physical media that do not support failure detection of any kind, such as Ethernet, virtual circuits, tunnels and Multi-Protocol Label Switch (MPLS) Label Switched Paths. BFD establishes a session between two endpoints over a particular link that is explicitly configured between endpoints. A BFD session can operate in an asynchronous mode, each of the network element endpoints periodically send Hello packets to each other. If a requisite number of BFD packets are not received, the session is considered down.

In addition, either endpoint in the BFD session may also initiate an Echo function. When this function is active, a stream of Echo packets is sent, and the other endpoint then sends these Echo packets back to the sender via its forwarding plane. This can be used to test the forwarding path on the remote system.

A number of services can use BFD as a fast fault detection mechanism to determine if a link is down and adjust the service accordingly. For example, Border Gateway Protocol (BGP), Open Shortest Path First (OSPF), Protocol Independent Multicast (PIM), First Hop Redundancy Protocol (FHRP), Link Aggregate Services (LAG), and/or other services can use BFD to detect that a link for the service is down and adjust that service accordingly.

A problem can occur if a failover occurs in a control plane in the network element from an active one central processing unit (CPU) to a standby CPU, and the BFD sessions are processed by the control plane. During a control plane failover, the failover from an active to standby CPU can take up to 30 seconds for the control plane to resume functioning. In addition, the network element is "headless," where the data plane continues to process network data. Thus, during this control plane failover time, the data plane of the failover network element can continue to forward network data and this function of the network element is not down. However, during this failover time, the BFD sessions are disrupted, which can lead to other network elements in the BFD sessions believing that this network element is completely down. Thus, other network elements in the BFD sessions will treat the failover network element as being down, when the data plane of the failover network element is still functioning. This false negative determined by BFD session can cause disruption in services and a churn in the network.

SUMMARY OF THE DESCRIPTION

A method and apparatus of a network element that configures a fault detection service is described. In an exemplary embodiment, the network element starts a fault detection service for the link on each of a first supervisor and a second supervisor of the network element. In addition, the first supervisor is active and the second supervisor is standby. The network element further saves a state for the fault detection service of the second supervisor. The network element additionally, and in response to a failover from the first supervisor to the second supervisor, continues the fault detection service of the second supervisor, wherein this fault detection service is active and sends fault detection packets on the link.

In another embodiment, a network element configures a fault detection service for a link of a network element. In this embodiment, the network element starts the fault detection service for the link on a supervisory component of the network element, where the supervisory component sends fault detection packets on the link. The network element additionally saves a state for the fault detection service of the supervisory component. Furthermore, and in response to an interruption of service in the supervisory component, the network element continues the fault detection service of the first supervisory component without indicating a detection of fault, where this fault detection service is active and sends fault detection packets on the link.

In a further embodiment, a network element configures a fault detection service for a link of a network element. In this embodiment, the network element receives an indication that the link is to be configured with a fault detection service. The network element additionally configures the fault detection service on the link with a parameter that allows the fault detection service to indicate that the link is up during a supervisory failover of another network element coupled to the link.

In yet another embodiment, the network element that configures a fault detection service on a multi-link group of a network element is described. In this embodiment, the network element starts the fault detection service on a first link of the multi-link group. The network element further configures a first packet for the fault detection service and transmits the first packet on the first link. The network element additionally receives the first packet and determines if the first packet was received on the first link. If the first packet was received on a different link, the network element configures a second packet by modifying a packet characteristic of the first packet and transmits the second packet on the first link. If the first packet was received on the first link, the network element marks the fault detection service for the first link as converged.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

Figure 1:
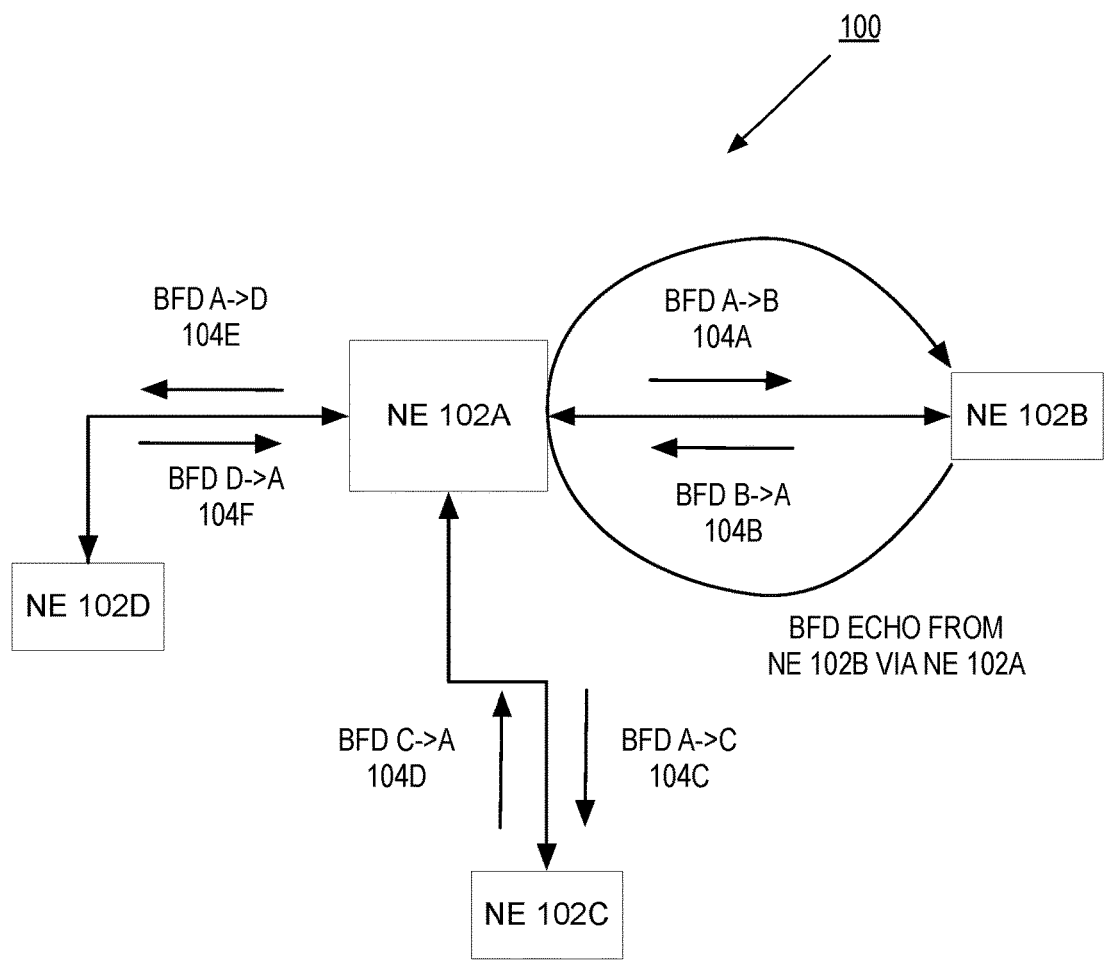
FIG. 1 is a block diagram of one embodiment of a system of network elements using fault detection.

A method and apparatus of a network element that configures a fault detection service is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that configures a fault detection service is described. In one embodiment, the network element can use a fault detection service for a fast detection of a connectivity down situation, link down, or another type of connectivity being unavailable (e.g., Bidirectional Forwarding Detection (BFD), and/or other types of fault detection). An interruption of connectivity can be due to a physical layer disconnect, the physical layer is up but a higher layer network functionality is unavailable (e.g., routing or another type of network service). In this embodiment, a fault detection can quickly notify the network element if a link of the network element is down, so that a network service that uses this link can adjust accordingly. For example and in one embodiment, BGP, OSPF, PIM, FHRP, LAG, and/or other services can use the fault detection mechanism to detect that a link for the service is down and adjust that service accordingly.

A problem can occur if a failover occurs in a control plane in the network element from an active CPU to a standby CPU, where the fault detection sessions are processed by the control plane. During a control plane failover, the failover from an active to standby CPU can take up to 30 seconds for the control plane to resume functioning. In addition, during the control plane failover, the network element is "headless," where the data plane continues to process network data. Thus, during this control plane failover time, the data plane of the failover network element can continue to forward network data and this function of the network element is not down. In addition, during this failover time, the fault detection sessions are disrupted, which can lead to other network elements in the fault detection sessions believing that this network element is completely down.

In one embodiment, in order to overcome the disruption of fault detection sessions or services, the network element can perform one or both of two actions: (i) the network element can use a fault detection echo service that is configured to survive a control plane failover of a neighboring network element; and (ii) the network element can save a state of the fault detection service in a standby supervisory and resumes the fault detection service after the control plane failover in this network element. In this embodiment, the first action is used to prevent a disruption of a fault detection service in a network element if there is a control plane failover in a neighboring network element. By using a fault detection echo service in the network element, the fault detection service can survive a control plane failover in a neighboring network element. This is because the neighboring network element processes the fault detection echo packet using the data plane, which remains functional during the control plane failover of this network element.

In a further embodiment, by saving a fault detection state in a standby supervisor, a network element undergoing a control plane failover can resume the fault detection service after the control plane failover.

In another embodiment, the network element is coupled with a remote network element via a LAG of two or more physical links. In this embodiment, the network sets up a fault detection service on each of the physical links of the LAG (e.g., an asynchronous mode BFD session on each physical link). In addition, to have a fault detection echo service running on each of the links, the network element determines what type of packet should be used for the fault detection echo service, since the remote network element will select one of the physical links of the LAG to return the fault detection echo packet. In one embodiment, the network element changes the user datagram protocol (UDP) source port of the echo packet to different values so as to hunt for an echo packet that will be received on the same link that this packet transmitted on.

BFD and Supervisory Failover

FIG. 1 is a block diagram of one embodiment of a system 100 of network elements 102A-D using fault detection. In FIG. 1, the system 100 includes one network element 102A coupled to other network elements 102B-D. In one embodiment, each of the network elements 102A-D can be a switch, router, hub, bridge, gateway, etc., or any type of device that can communicate data packets with a network. In one embodiment, any of the network elements 102A-D can be a virtual machine. While in one embodiment, network element 102A is coupled to three other network elements, in alternate embodiments, the network element 102A can be coupled to more or less numbers of network elements in the same or different topologies.

In one embodiment, the network element 102A is involved in a number of fault detection sessions with the other network elements 102B-D (e.g., a BFD session, or some other type of fault detection mechanism). While in one embodiment, BFD is discussed as an example of a fault detection mechanism, in alternate embodiments, the embodiments discussed herein can be applied to other types of fault detections mechanisms. Furthermore, examples presented discussing BFD can be applied to fault detection in general and other types of fault detection mechanisms. As described above, BFD is a network protocol used to detect faults between two network elements connected by a link. BFD provides low-overhead detection of faults even on physical media that do not support failure detection of any kind. For example and in one embodiment, the network element 102A participates in BFD sessions with network element 102B (BFD sessions 104A-B), network element 102C (BFD sessions 104C-D), and network element 102D (BFD sessions 104E-F). In each of these BFD sessions, the network element 102A can send or receive BFD packets with the other network elements 102B-D. In this embodiment, network elements 102A-D use these BFD sessions to determine if a link between the respective network elements is down. In one embodiment, each of the BFD sessions 104A-F is an asynchronous mode BFD session. In another embodiment, the network element 102B can send a BFD echo packet to network element 102A. In this embodiment, an echo packet is processed by network element 102A and sent back to the network element that transmitted this packet, namely network element 102B.

Figure 2:
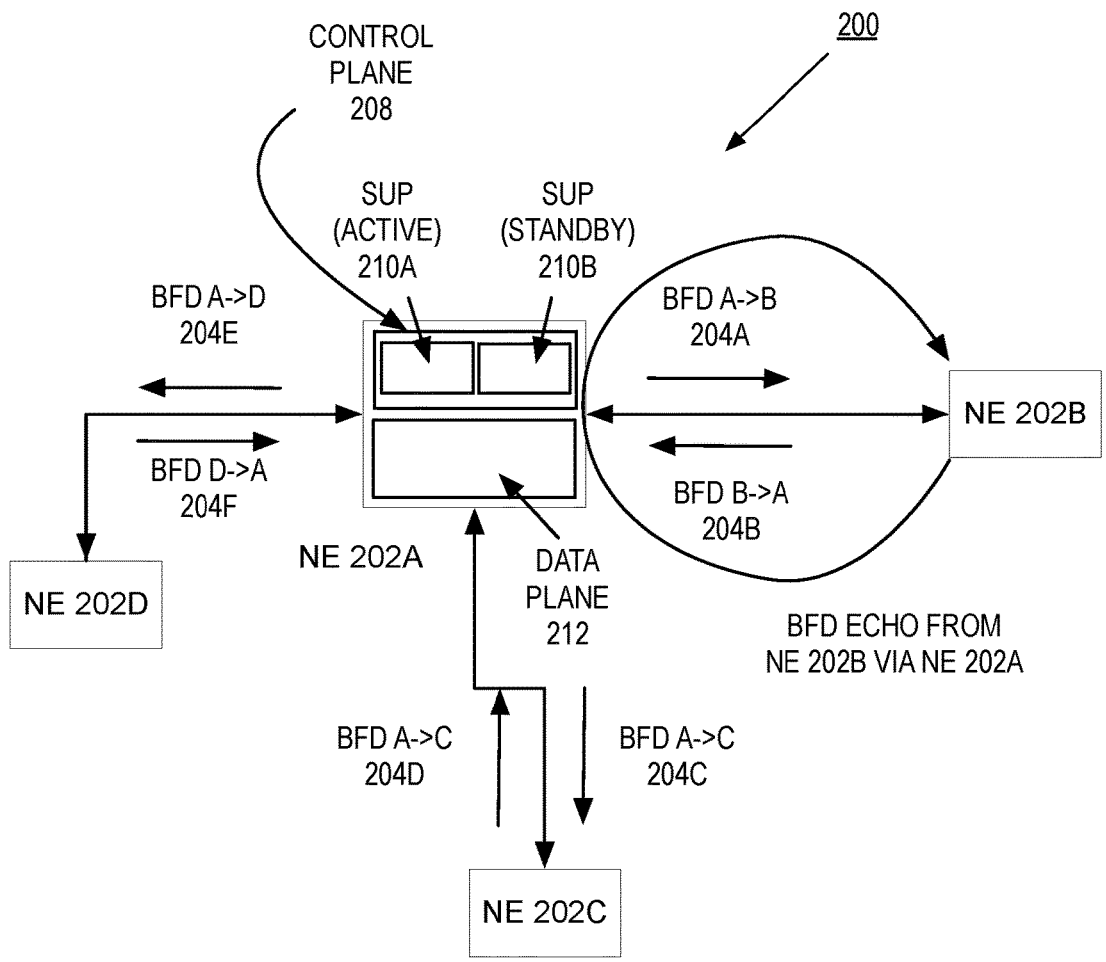
FIG. 2 is a block diagram of one embodiment of a system of network elements using fault detection, where one of the network elements includes active and standby supervisors.

FIG. 2 is a block diagram of one embodiment of a system 200 of network elements 202A-D using fault detection, where one of the network elements 202A includes active and standby supervisors 210A-B. Similar to FIG. 1 above, system 200 includes one network element 202A that is coupled to other network elements 202B-D. In addition, network element 202A participates in BFD sessions with network element 202B (BFD sessions 204A-B), network element 202C (BFD sessions 204C-D), and network element 202D (BFD sessions 204E-F). Furthermore, any and/or each of the network elements 202A-D can send BFD echo packets.

In one embodiment, a network element (e.g., network element 202A) can include a control plane and data plane, such as the control plane 208 and data plane 212 of network element 202A. In one embodiment, the control plane 208 can include multiple supervisors 210A-B, where one supervisor component 210A is active and the other supervisor 210B is standby. In one embodiment, each of the supervisors 210A-B includes a central processing unit (not illustrated) and/or other components that are used to control the network data processing of the network element. In one embodiment, each of the supervisors 210A-B can be a separate card that includes a CPU.

In this embodiment, the active supervisor 210A is used to process information for the control plane 208 and write configuration data for hardware forwarding engines in the data plane 212. The information processed by active supervisor 210A includes, for example, control plane data corresponding to a plurality of different classes of control plane traffic, such as routing protocol messages, routing table messages, routing decisions messages, route update messages, unresolved traffic messages, L2 protocol messages, link aggregation control protocol messages, link layer state updates messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network element), messages for routing table misses, time control messages (e.g., precision time protocol messages), messages for packets marked as being of interest for snooping (e.g., access control list logging and port mirroring messages), messages used to collect traffic diagnostics, address resolution messages (ARP) requests and replies, neighbor solicitation requests and replies, general communication to the control plane of the networking device, etc. The active supervisor 210A processes the control plane network data to perform control management updates and/or respond with control message responses (e.g., routing decisions, protocol updates, traffic resolutions, etc.).

In one embodiment, the control plane 208 further includes a number of processes that are used to execute the functionality of the control plane 208. In one embodiment, there can be processes for quality of service, access control lists management (or other types of security), policy service, fan agent, light emitting diode agent, temperature sensor agent, database service, management service(s), processes to support networking protocols (e.g. spanning tree protocol (STP), routing protocols (e.g. such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol), Multiprotocol Label Switching (MPLS), and/or other types of networking protocols), network flow management applications (e.g., openflow, directflow), process manager, and/or other types of processes for other types of functionality of the network element 202A.

In one embodiment, the data plane 212 receives, processes, and forwards network data, including control plane network data, using various configuration data (e.g., forwarding, security, quality of service (QoS), and other network traffic processing information). In one embodiment, for each received unit of network data (e.g., a packet), the data plane 102 determines a destination address for the network data, looks up the requisite information for that destination in one or more tables stored in the data plane, and forwards the data out the proper outgoing interface, for example, one of the interface devices of the network element 202A.

Figure 3:
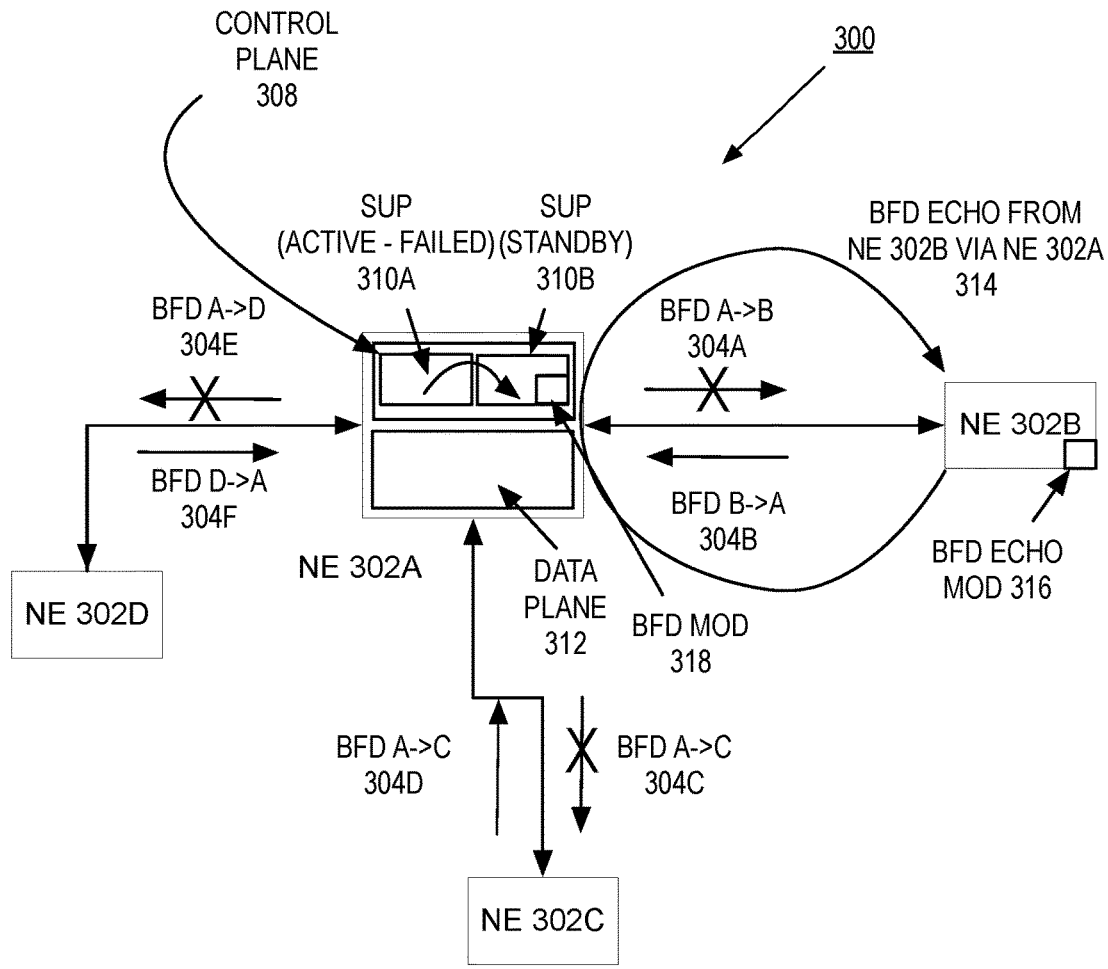
FIG. 3 is a block diagram of one embodiment of a system of network elements using fault detection, where one of the network elements has a failover of the active supervisor to a standby supervisor.

FIG. 3 is a block diagram of one embodiment of a system 300 of network elements 302A-D using fault detection, where one of the network elements 302A has a failover of the active supervisor 310A to a standby supervisor 310B. Similar to the network element in FIG. 2, network element 302A includes a data plane 312 and control plane 308, where the control plane 308 includes an active 310A and standby 310B supervisors. In addition, the system 300 includes one network element 302A that is coupled to other network elements 302B-D. In addition, network element 302A participates in BFD sessions with network element 302B (BFD sessions 304A-B), network element 302C (BFD sessions 304C-D), and network element 302D (BFD sessions 304E-F). Furthermore, any and/or each of the network elements 302A-D can send BFD echo packets.

Because there are multiple supervisors of the network element 302A, the active supervisor actively controls the processing functions of the network element and a standby supervisor that takes over control of the network element processing control in the event of a failure of the active supervisor. The active supervisor could fail due to a hardware failure of the supervisor itself or a component that the active supervisor uses (e.g., memory, controller, bus, or another hardware component). Alternatively, the active supervisor may fail due to a software failure. In the event of the active supervisor failure, the standby supervisor takes over the control of the network element processing functions. In this case, the data plane can continue to operate while the standby supervisor takes control. A supervisor component failover can take up to 30 second or longer for the network element 302A. A failover of the active supervisor 312A to a standby supervisor 312B is also called a control plane failover.

In one embodiment, the active supervisor 312A of the control plane 308 processes the packets of the fault detection sessions (e.g., BFD sessions). For example and in one embodiment, the active supervisor 312A sends and receives asynchronous mode BFD packet with network element neighbors (e.g., network element 302B-D) to determine if a respective link between the network element 302A and a neighbor network element has gone down. In addition (or instead), the network elements 302A-D can send BFD echo packets.

In one embodiment, because the fault detection packets are processed in the control plane 308 of the network element 302A, if the control plane 308 fails over from the active supervisor 310A to the standby supervisor 310B, the BFD sessions can be disrupted for up to 30 seconds or longer. The disruption can be due to using asynchronous mode BFD sessions. This can cause network elements 302B-D to believe that network element 302A is down and adjust network services of these network elements 302-D accordingly. For example and in one embodiment, if network element 302B stops receiving asynchronous mode BFD packets from network element 302A, a BGP or OSPF service may stop using network element 302A as a next hop, causing packets to be forwarded out a different interface. This example shows the loss of use of the data plane 312 even though this data plane 312 is still functioning during the control plane 308 failover.

In one embodiment, there are possible types of disruptions to a fault detection service in the case of a control plane failover in network element 302A: (i) loss of the asynchronous mode BFD packets being sent from network element 302A to neighboring network elements 302B-D, which triggers a fault detection in the neighboring network elements 302B-D for the link between network element 302A and the neighboring network elements 302B-D; and (ii) loss of BFD packet receipt by the network element 302A from the neighboring network elements 302B-D, which triggers a fault detection in the neighboring network element 302A for the link between network element 302A and the neighboring network elements 302B-D.

In order to alleviate the possibility of a control plane failover disrupting fault detection session due to the loss of asynchronous mode BFD packets being received by the neighboring network elements 302B-D, in one embodiment, each of the neighboring network elements 302B-D can use a BFD echo service instead of relying on the sending of asynchronous mode BFD packets by network element 302A. In this embodiment, one, some, or all of neighboring network elements 302B-D configure a BFD echo mode so that the neighbor BFD peer session will stay up on the respective neighboring network element 302B-D, while network element 302A runs through a control plane failover. Furthermore, the neighboring network element 302B-D with the BFD echo mode running configures a BFD slow-timer such that the BFD detect time is greater than the duration of a control plane failover of network element 302A.

In one embodiment, using the BFD slow-timer allows for the BFD control packets to be sent at a slower rate when BFD echo mode is enabled. Thus, BFD will still detect the loss of the control plane, but not until it has been gone for (slow-timer * multiplier) seconds. In this embodiment, the slow timer is configured such that this time period (e.g. slow-timer * multiplier) is greater than that required by network element 302A control plane failover and begin transmitting BFD packets. In one embodiment, the slow timer is 2 seconds or greater.

In one embodiment, by using a BFD echo mode instead of an asynchronous mode BFD service, a neighboring network element 302A-D is relying on the data plane 312 of the network element 302A to relay the BFD echo packet, because the data plane 312 remains functioning during the control plane failover, instead of relying on the control plane 312 to send asynchronous mode BFD packets. In one embodiment, a BFD echo module 316 brings up and configures a BFD echo service as described above. Configuring of a BFD echo mode is further described in FIG. 4 below.

With respect to the second type of possible disruption of a fault detection service, instead of just restarting a fault detection service anew after a control plane failover for network element 302A, network element 302A saves a state of the fault detection service in the standby supervisor 310B and resumes the fault detection service after the control plane failover.

In one embodiment, instead of running the fault detection service on just the active supervisor, the network element 302A runs the fault detection service on both the active and standby supervisors 312A-B. In this embodiment, a number of BFD state machines run that send two messages to the kernel of the active supervisor for each BFD session. One message is a transmit set packet message that is used to configure the kernel such that the kernel can send periodic BFD packets. The second message is a receive set session message that is used to configure the kernel to look for received periodic BFD packets.

In this embodiment, BFD is run on both the active and standby supervisor. The BFD agent on the active supervisor will send the kernel messages to the kernel and also to the BFD agent on the standby supervisor. The BFD agent on the standby supervisor will program the kernel on the standby supervisor. Furthermore, the standby kernel will try to periodically transmit packets. The BFD kernel component of the standby supervisor kernel will drop these packets before transmitting until a message is received by the kernel from the BFD agent indicating that the transmit path is active. This is done by the BFD agent during control plane failover. In addition, the BFD agent will monitor the standby supervisor redundancy status for changes in the redundancy mode. When this mode transitions into the time critical services mode, the BFD agent will tell the kernel to allow BFD transmit packets to egress the kernel. In one embodiment, the kernel message is used for the asynchronous mode BFD session on the active and standby supervisors.

In addition, the standby kernel will also be programmed with receive sessions. This receive session configuration is identical to that on the active supervisor except that the timer active flag is disabled. Thus, no session timeout will occur. Instead, the timer active flag will be set when the BFD agent state machines become active after switchover. In one embodiment, a BFD module 316 saves a kernel state in the standby supervisor and uses this kernel state to resume a BFD session. Saving the kernel state and resuming a BFD session is further described in FIGS. 5A-B below.

Figure 4:
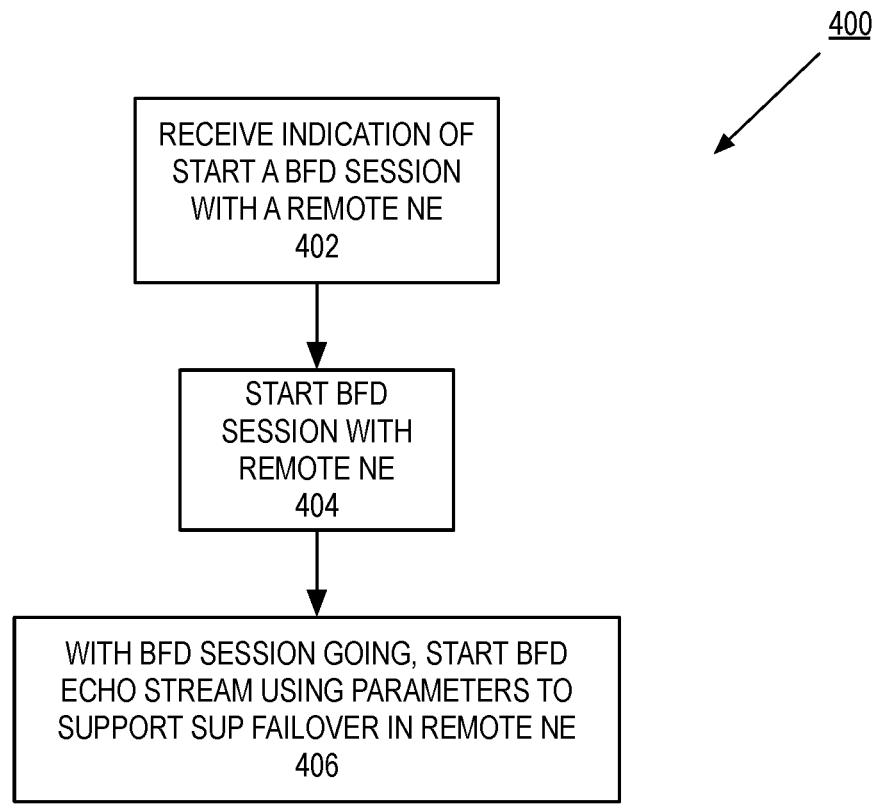
FIG. 4 is a flow diagram of one embodiment of a process to bring up a fault detection service on a network element using an echo stream.

As described above, a control plane failover in a network element can cause a detected fault of a link in a fault detection service for a remote network element even though the data plane is still functioning for the network element having the control plane failover. In one embodiment, the FIG. 4 is flow diagram of one embodiment of a process 400 to bring up a fault detection service on a network element using an echo stream. In one embodiment, a BFD echo module brings up a fault detection service on a network element using an echo stream, such as the BFD module 316 as described in FIG. 3 above. In FIG. 4, process 400 begins by receiving an indication to start a BFD session with a remote network element at block 402. In one embodiment, process 400 can receive the indication as a result of a command entered by an administrator via a management interface (e.g. a command line interface (CLI), graphical user interface (GUI), or another type of management interface). At block 404, process 400 starts a BFD session with the remote network element. In one embodiment, process 400 starts the BFD session with a three-way handshake with the remote network element. With the established BFD session, process 400 starts a BFD echo stream using parameters to support a supervisory failover in the remote network element. In one embodiment, process 400 configures a BFD slow timer to be such that the BFD session will survive a control plane failover in the remote network element. For example and in one embodiment, process 400 configures the BFD session to have a slow timer of at least two seconds.

Figure 5A:
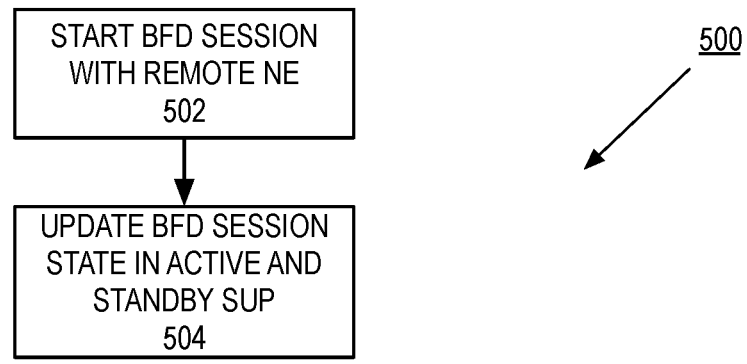
FIG. 5A is a flow diagram of one embodiment of a process to start a fault detection session and updates a state for the fault detection.

The control plane failover can further cause the network element having the control plane failover to lose track of BFD packet receipt from other network elements. In one embodiment, the network element saves a state of the BFD session, so the network element can resume the BFD session after a control plane failover. In one embodiment, the BFD session state is generated by active supervisor, such as the active supervisor 210A in FIG. 2 above. FIG. 5A is flow diagram of one embodiment of a process 500 to start a fault detection session that updates a state for the fault detection. In one embodiment, a BFD module saves a BFD state, such as the BFD module 318 as described in FIG. 3 above. In FIG. 5A, process 500 starts a BFD session with a remote network element at block 502. In one embodiment, process 500 starts a BFD session as a result of a command entered by an administrator via a management interface (e.g. a command line interface (CLI), graphical user interface, or another type of management interface). In one embodiment, instead of running the fault detection service on just the active supervisor, process 500 runs the fault detection service runs on both the active and standby supervisors.

At block 504, process 500 updates the BFD session state in active and standby supervisors. In one embodiment, a number of BFD state machines run that send two messages to the kernel of the active supervisor for each BFD session. One message is a transmit set packet message that is used to configure the kernel such that the kernel can send periodic BFD packets. The second message is a receive set session message that is used to configures the kernel to look for received periodic BFD packets.

In this embodiment, process 500 configures the network element such that BFD is run on both the active and standby supervisor. Furthermore, the BFD agent on the active supervisor will send the kernel messages to the kernel and also to the BFD agent on the standby supervisor. The BFD agent on the standby supervisor will program the kernel on the standby supervisor. Furthermore, the standby kernel will try to periodically transmit packets. The BFD kernel component of the standby supervisor kernel will drop these packets before transmitting until a message is received by the kernel from the BFD agent indicating that the transmit path is active. This is done by the BFD agent during control plane failover. In addition, the BFD agent will monitor the standby supervisor redundancy status for changes in the redundancy mode. When this mode transitions into the time critical services mode, the BFD agent will tell the kernel to allow BFD transmit packets to egress the kernel.

In addition, process 500 programs the standby kernel with receive sessions. This receive session configuration is identical to that on the active supervisor except that the timer active flag is disabled. Thus, no session timeout will occur. Instead, the timer active flag will be set when the BFD agent state machines become active after switchover.

Figure 5B:
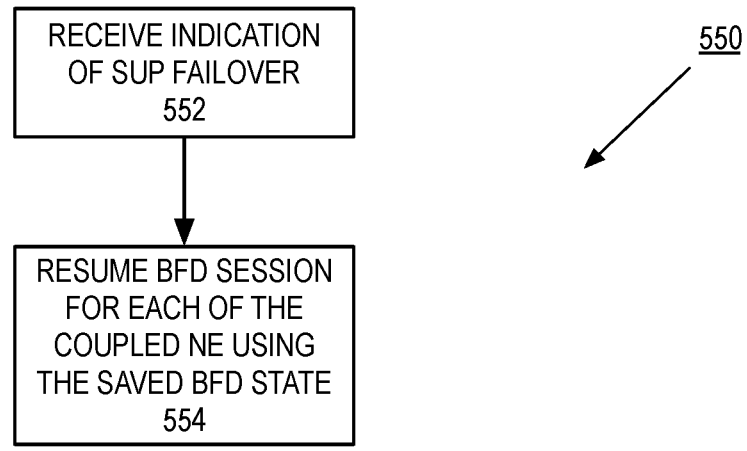
FIG. 5B is a flow diagram of one embodiment of a process to resume the fault detection session after a failover.

With the BFD session state maintained in the standby supervisor, the network element can resume the BFD session for remote network elements after a control plane failover. FIG. 5B is flow diagram of one embodiment of a process 550 to resume a fault detection service after a failover a fault detection service. In one embodiment, a BFD module resume a fault detection service after a failover of a fault detection service, such as the BFD module 318 as described in FIG. 3 above. In FIG. 5B, process 500 receives an indication of a control plane failover at block 552. In one embodiment, process 550 determines that there has been a control plane failover by process 550 monitoring the standby supervisor redundancy status for changes in the redundancy mode. At block 554, process 550 resumes the BFD session for each of the couple network elements using the saved BFD state. In one embodiment, process 550 determine when this component redundancy status transitions into the time critical services mode, the process 550 will tell the kernel to allow BFD transmit packets to egress the kernel for that supervisor.

While in one embodiment, the saving of a kernel state and resumption of a fault detection service is described in terms of a control plane failover from an active to standby supervisor, in an alternate embodiment, the saving of a kernel state can be used in a network element that has one supervisor. In this embodiment, the network element includes a single supervisor, such a single CPU. Because there is just a single supervisor, in this embodiment, there is not a failover from an active to standby supervisor. Instead, there can be an interruption of service with the single supervisor, where this supervisor recovers and resumes operation. The interruption can be due to a restart of the supervisor, an upgrade of the supervisor, and/or another type of event.

In one embodiment, the single supervisor starts a BFD session with a remote network element and saves a state of this BFD session in the single supervisor. For example and in one embodiment, one or more BFD state machines can send two messages to the kernel of the supervisor for each BFD session. One message is a transmit set packet message that is used to configure the kernel such that the kernel can send periodic BFD packets. The second message is a receive set session message that is used to configures the kernel to look for received periodic BFD packets. With the maintained state in the supervisor, the supervisor can resume the fault detection service as the supervisor resumes operation and, further, resumes transmitting and receiving BFD packets.

BFD and Link Aggregate Groups

A network element can use utilize multiple aggregated links (e.g., a Link Aggregate Group (LAG)) with another network element for greater bandwidth and reliability. In one embodiment, a LAG is a single logical link and the network element will use an internal algorithm to choose which one of the multiple links to transmit network data. A problem running a fault detection service, such BFD echo, on a LAG is that a BFD echo packet transmitted on one link of the LAG maybe returned on another LAG link. For example and in one embodiment, if a LAG between two network elements has links A, B, and C and a network element transmits an echo packet on link A, the network element may receive the BFD echo packet on different link, say link C. In this example, this BFD echo service would be testing for faults on the transmission of link A and receives on link C. Thus, in this example, would not be testing a bidirectional fault on just one link.

Figure 6:
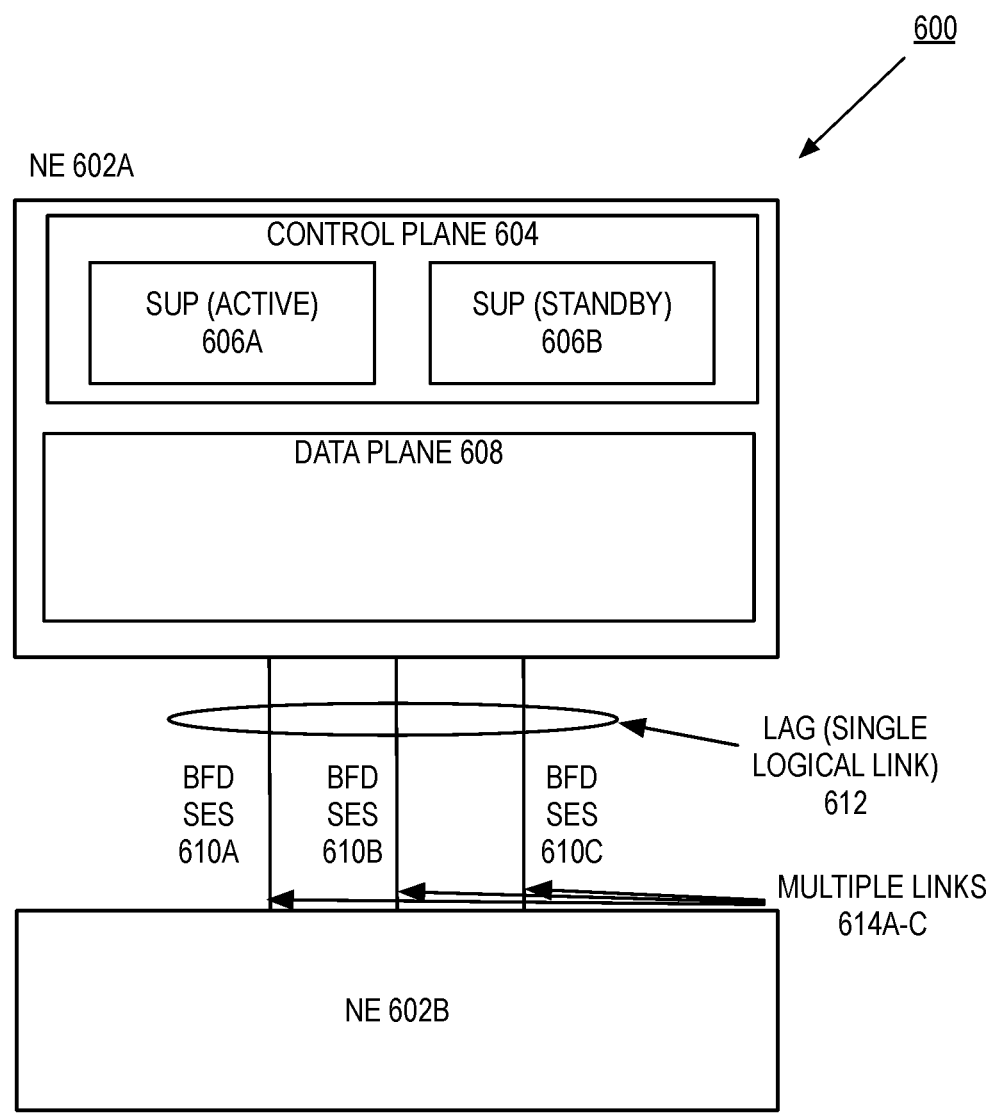
FIG. 6 is a block diagram of one embodiment of a system with a Link Aggregate Group (LAG) between two network elements.

FIG. 6 is a block diagram of one embodiment of a system 600 with a LAG 612 between two network elements 602A-B. In FIG. 6, system 600 includes two network element 602A-B that are coupled by a LAG 612. In one embodiment, the LAG 612 is an aggregation of multiple links 614A-C. In this embodiment, the LAG 612 is a single logical link and uses an internal algorithm to choose which one of the multiple links to transmit network data. While in one embodiment, the LAG 612 is illustrated with three links 614A-C, in alternate embodiments, the LAG 712 can have more of less number of links. Furthermore, in this embodiment, the network element 602A includes a control plane 604 and data plane 608, where the control plane includes an active supervisor 606A and standby supervisor 606B.

In one embodiment, the network elements 602A-B start BFD sessions 610A-C on each of the multiple links 614. In this embodiment, the BFD sessions are asynchronous mode BFD session 610A-C on each of the multiple links 614A-C, where each network element 602A-B sends asynchronous mode BFD packets on each of the links. Thus, in this embodiment, each network element 602A-B uses the same link to transmit the BFD packet that the BFD session is established on.

Figure 7:
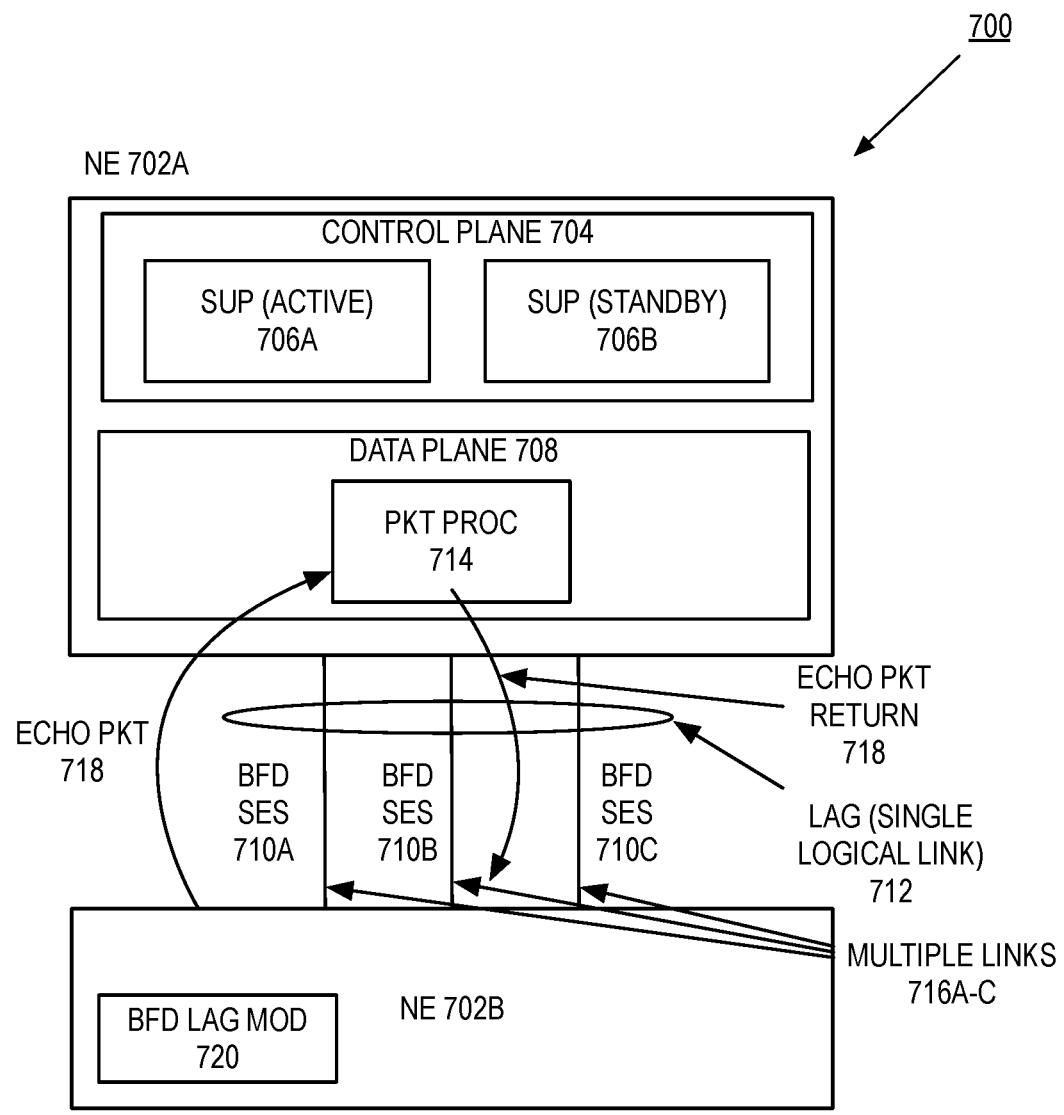
FIG. 7 is a block diagram of one embodiment of a system with a LAG between two network elements where an echo packet is transmitted and received on different links of the LAG.

This is in contrast with a BFD echo service, because the remote network element may choose a different link of a LAG than the echo packet was received on to send the echo packet back to its originator. FIG. 7 is a block diagram of one embodiment of a system 700 with a LAG 712 between two network elements where an echo packet is transmitted and received on different links of the LAG 712. In FIG. 7, system 700 includes two network element 702A-B that are coupled by a LAG 712. In one embodiment, the LAG 712 is a single logical link that is an aggregation of multiple links 716A-C. While in one embodiment, the LAG 612 is illustrated with three links 716A-C, in alternate embodiments, the LAG 712 can have more or less number of links. Furthermore, in this embodiment, the network element 702A includes a control plane 704 and data plane 708, where the control plane includes an active supervisor 706A and standby supervisor 706B.

In one embodiment, the data plane 708 of the network element 702A includes a packet processor 714. In this embodiment, the packet processor 714 is a processor that forwards data for the network element 702A, such as performing routing, switching, or other types of network forwarding or processing. In particular, the packet process 714 can determine which link to transmit a packet on the LAG 712. There are number of ways that the packet processor 714 can use to select which link in the LAG 712 to transport the packet to a destination device. For example and in one embodiment, the packet processor 714 can use a hash-based link selection mechanism, or a different type of link selection mechanism. The hash-based link selection mechanism hashes packet characteristics of each packet to transmit and selects one of the links 716A-C using the hash. What type of hash function that is used and the types of inputs used for this hash function varies based on the manufacturer of the network element, the number of links in the LAG 712, and/or the hardware and/or software configuration of the network element 702A, and/or other characteristics of the network element 702A. Thus, the hash-based function and the results of the hash-based function can be difficult to predict as the type of hash-based function and the inputs may not be known ahead of time.

This can be a problem for a BFD echo service, because to test the bidirectional availability of a link, a packet should be transmitted and received on the same link. However, when transmitting a BFD echo packet 718 on one of the links, say link 716A from network element 702A to network element 702A, there is no guarantee that the packet processor 714 will select the same link 716A to transmit the BFD echo packet 718 back to network element 702B. For example and in one embodiment, the packet processor 714 could select link 716B as the link to send back the BFD echo packet 718 to the network element 702B. By having the BFD echo packet being transmitted and received on different link, this BFD echo service is not testing the bidirectional availability of a single link.

In one embodiment, the network element 702B determines a type of BFD packet to send to network element 702A, such that network element 702A sends this BFD packet back to network element 702B on the same link of LAG 712 received by network element 702A. In one embodiment, the network element 702B can vary the packet characteristics of the BFD echo packet so as to hunt for the correct type of packet that will be transmitted and received on the same link on the LAG 712. In this embodiment, a link-selection mechanism will hash at least the packet header characteristics. For example and in one embodiment, a BFD echo packet is an Internet Protocol (IP), User Datagram Protocol (UDP) encapsulated packet and a header for this packet would have the following fields: (1) layer-2 header; (2) IP header; (3) UDP header. These headers are followed by the BFD echo packet payload. Many of the values in the packet header are fixed, so these values cannot be manipulated (e.g., IP source and destination addresses, MAC source and destination addresses, UDP destination port, and/or other packet header values). However, the UDP source port can be modified, since the transmitting network element (e.g., network element 702B) can select which port is used to transmit the BFD echo packet.

In one embodiment, the network element 702B sends BFD echo packets 718 with different UDP source port values to determine which UDP source port value causes a BFD echo packet to be received on the same link of a LAG 712 that was used to transmit the packet. If the network element 702B determines that a BFD echo packet 718 is received on a different link than was used to transmit, the network element 702B changes the UDP source port value to a different value and sends the new BFD packet 718 on the same link.

In particular, the network element 702A would change the UDP source port in the BFD echo packet 718 until the receiving link is the same as the sending link (convergence period). Once convergence period concludes successfully, the set of "good" UDP source ports in the packets will not change in the steady state. In one embodiment, there can be one or more UDP ports that satisfy the condition that the sending and receiving link are the same. In addition, any events that will cause traffic hashing to change (e. g., any link addition/deletion/flap to the LAG) will cause the network element 702B to re-enter the convergence period and hunt for another set of UDP source ports that satisfy the condition of the same sending and receiving links.

Furthermore, the network element 702B keeps the BFD Echo session alive as long as the packets return (echoed back) on any of the links 716A-C. In addition, the transmit rate of source port hunting packets of the network element 702A during convergence period can be governed. Sending too many BFD echo packets 718 can cause drop at the peer side and could potentially victimize other existing BFD sessions. When a BFD Echo session is enabled, the transmit interval on a port of network element 702B is negotiated with the echo receive interval of the port of network element 702A. In one embodiment, the port of network element 702B keeps hunting one packet at a time and so as not to flood BFD Echo packets at the same time with different source ports.

In this embodiment, there are no or relatively little extra packets used for hunting and this process can last for a relatively long time. If the convergence period takes too long a time, network element 702B can stop the convergence period.

In one embodiment, selection of which UDP source port to use for the link can be done either by selection of a randomized unused UDP source port or predicting which port might be used based on information regarding the remote network element. For example and in one embodiment, network element 702B can choose a randomized port from a list of unused UDP ports. In another example and embodiment, network element 702B can determine a type of hash function and/link selection and create a BFD echo packet to fit that type of hash function and/or link selection. In this example, the network element 702B can receive this information from network element 702A, management station, or some other device. In one embodiment, a BFD LAG module 720 determines the type of BFD echo packet to use for a particular link. Determining a type of echo packet to use is further described in FIG. 8 below.

Figure 8:
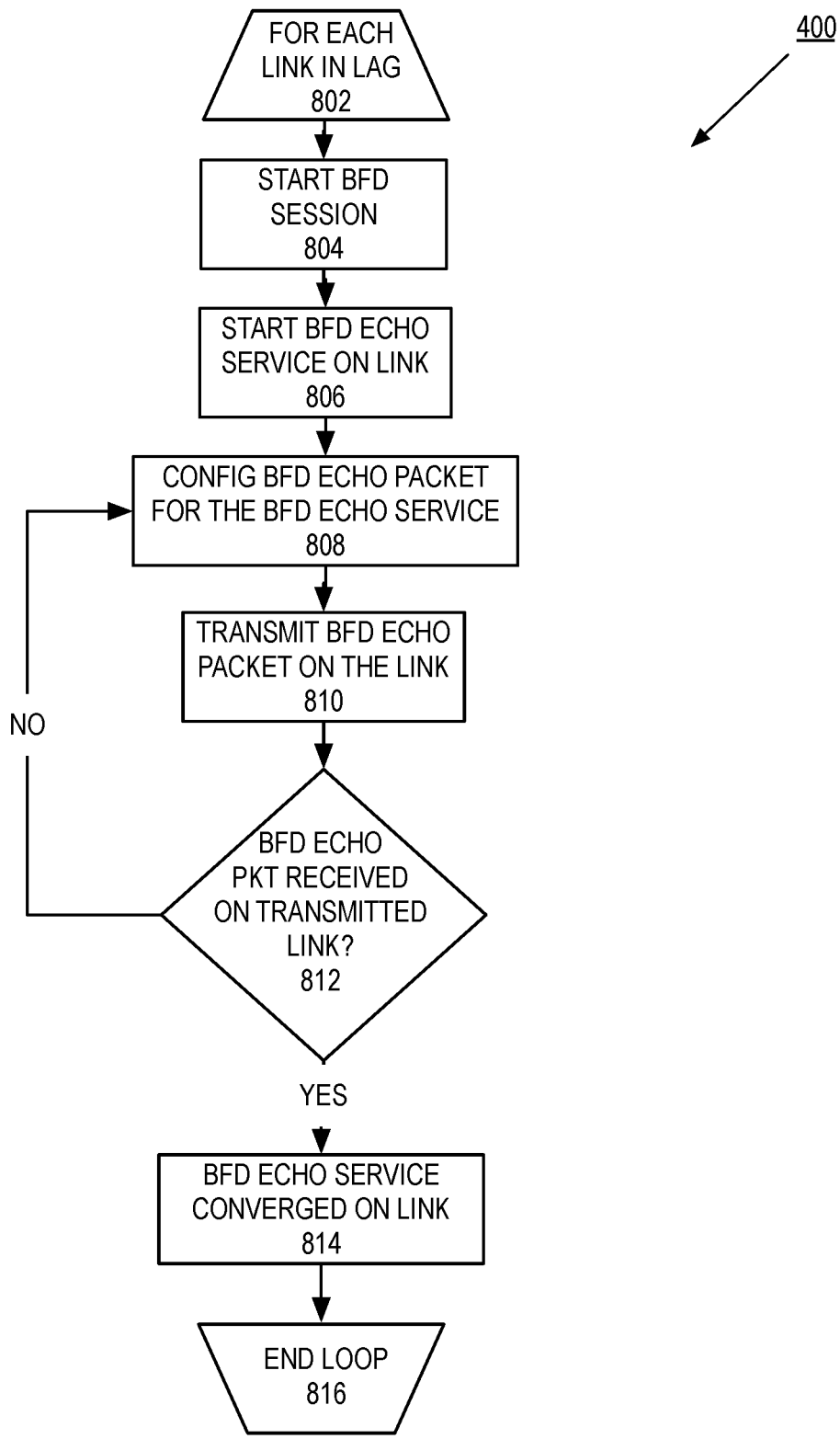
FIG. 8 is flow diagram of one embodiment of a process to determine a type of echo packet that is sent and received on the same link of a LAG.

FIG. 8 is flow diagram of one embodiment of a process 800 to determine a type of echo packet that is sent and received on the same link of a LAG. In one embodiment, a BFD LAG module determines the type of echo packet to use, such as the BFD LAG module 720 as described in FIG. 7 above. In FIG. 8, process 800 begins by performing a processing loop (blocks 802-816) to converge a BFD echo service on each link of a LAG coupling two network elements. At block 804, process 800 starts a BFD session on the link. In one embodiment, process 800 starts a BFD session as a result of a command entered by an administrator via a management interface (e.g. a command line interface (CLI), graphical user interface, or another type of management interface). Process 800 starts a BFD echo service on a network element for the link at block 806. In one embodiment, the BFD echo service is in a convergence period as the BFD echo service has not converged on a set of one or more packet characteristics (e.g., UDP source port) that allow the BFD echo service to send and receive the BFD echo packets on the same link.

At block 808, process 800 configures a BFD echo packet to be sent on the link. In one embodiment, process 800 configures the BFD echo packet by choosing a UDP source port to test the remote network element's link selection mechanism. In another embodiment, process 800 receives some information that indicates what type of BFD echo packet to use. Process 800 transmits the configured BFD echo packet on the link at block 810. At block 812, process 800 determines if the BFD echo packet is received on the same link that was used to transmit this packet. If not (or if process 800 wants to find additional packet characteristics that work for this link), execution proceeds to block 808 above. If a BFD echo packet is received on the same link that was used to transmit this packet (and if process 800 determines that there enough different types of BFD echo packets), process 800 determines that the BFD echo service has converged for this link. The processing loop ends at block 816.

Figure 9:
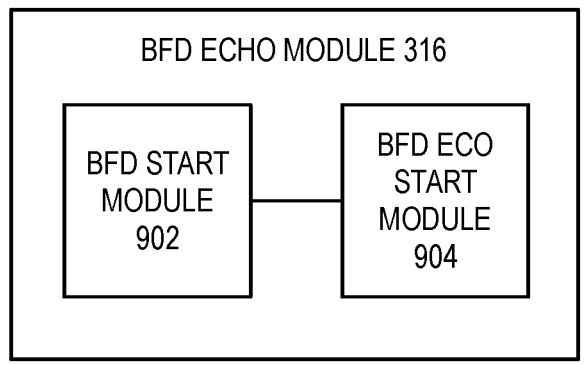
FIG. 9 is a block diagram of one embodiment of a BFD echo module that brings up a fault detection service.

FIG. 9 is a block diagram of one embodiment of a BFD echo module 316 that brings up a fault detection service. In one embodiment, the BFD echo module 316 includes a BFD start module 902 and a BFD echo module 904. In one embodiment, the BFD start module 902 starts the BFD session for a link as described in FIG. 4, block 402 above. The BFD echo module 904 starts a BFD echo service as described in FIG. 4, block 404 above.

Figure 10:
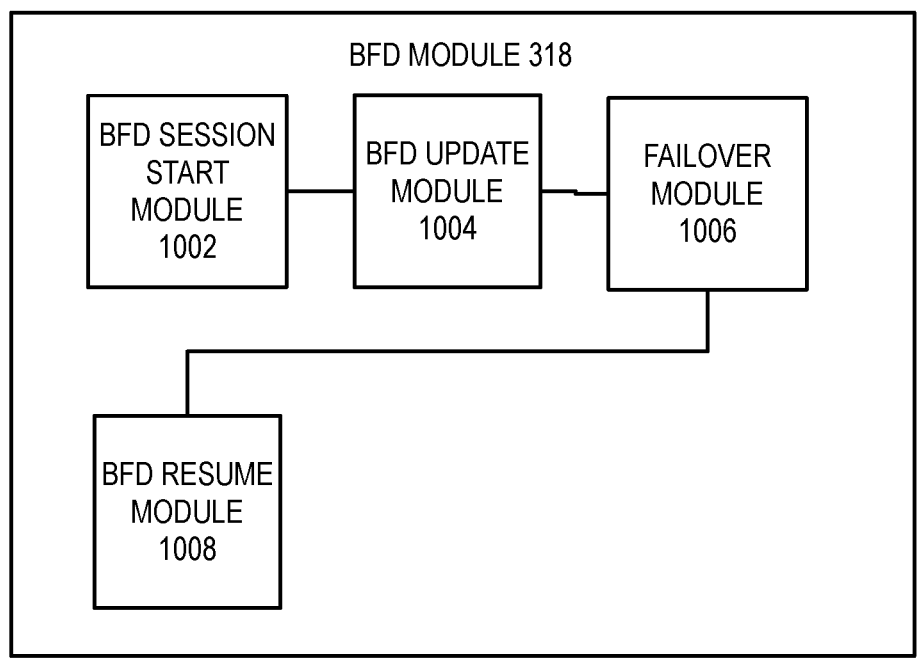
FIG. 10 is a block diagram of one embodiment of a BFD module that starts a fault detection session and resumes the fault detection session after a failover.

FIG. 10 is a block diagram of one embodiment of a BFD module 318 that starts a fault detection session and resumes the fault detection session after a failover. In one embodiment, the BFD module 318 includes a BFD session start module 1002, BFD update module 1004, failover module 1006, and BFD resume module 1008. In one embodiment, the BFD session start module 1002 starts the BFD session on a standby supervisor as described in FIG. 5A, block 502. The BFD update module 1004 updates the BFD state as described in FIG. 5A, block 504. The failover module 1006 receives an indication of a control plane failover as described in FIG. 5B, block 552. The BFD resume module 1008 resumes the BFD session as described in FIG. 5B, block 554.

Figure 11:
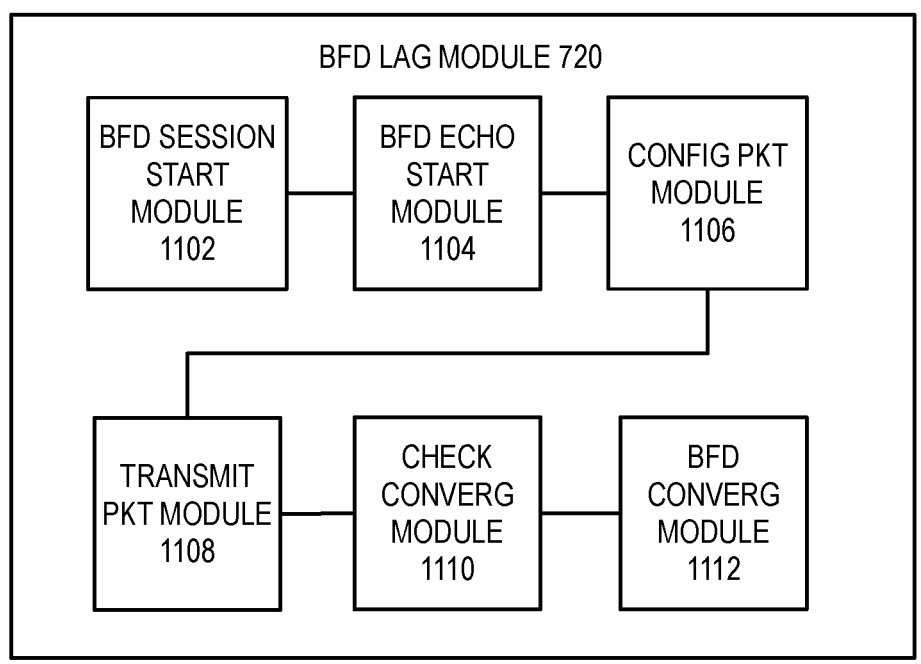
FIG. 11 is a block diagram of one embodiment of BFD LAG module that determines a type of echo packet that is sent and received on the same link of a LAG.

FIG. 11 is a block diagram of one embodiment of BFD LAG module 720 that determines a type of echo packet that is sent and received on the same link of a LAG. In one embodiment, the BFD LAG module 720 includes a BFD start session 1102, BFD echo start module 1104, configure packet module 1106, transmit packet 1108, check convergence module 1110, and BFD convergence module 1112. In one embodiment, the BFD start session 1102 starts a BFD session on a link as described in FIG. 8, block 804 above. The BFD echo start module 1104 starts the BFD echo service on a link as described in FIG. 8, block 806 above. The configure packet module 1106 configures a BFD echo packet as described in FIG. 8, block 808 above. The transmit packet 1108 transmits the BFD echo packet as described in FIG. 8, block 810 above. The check convergence module 1110 checks for convergence as described in FIG. 8, block 812 above. The BFD convergence module 1112 marks the BFD echo service as converged as described in FIG. 8, block 814 above.

Figure 12:
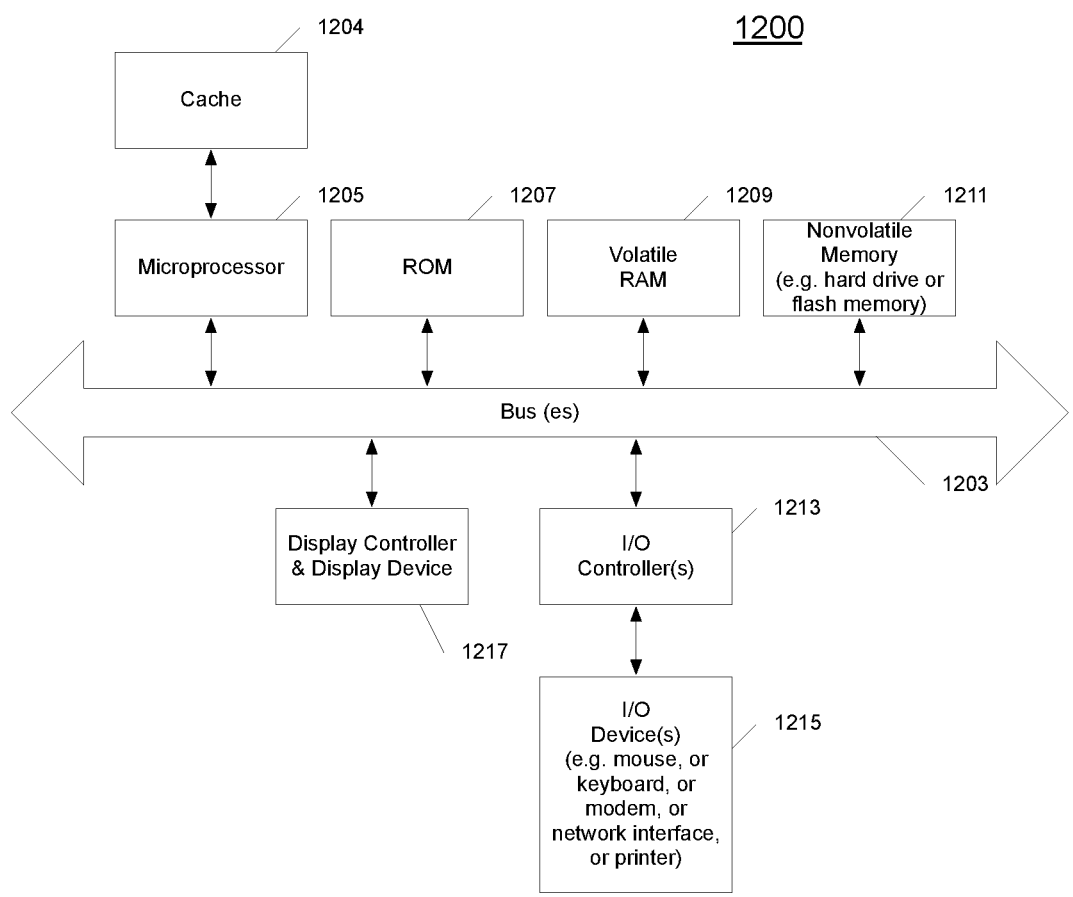
FIG. 12 illustrates one example of a typical computer system, which may be used in conjunction with the embodiments described herein.

FIG. 12 shows one example of a data processing system 1200, which may be used with one embodiment of the present invention. For example, the system 1200 may be implemented including a network element 302A or 702A as shown in FIGS. 3 and 7. Note that while FIG. 12 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 12, the computer system 1200, which is a form of a data processing system, includes a bus 1203 which is coupled to a microprocessor(s) 1205 and a ROM (Read Only Memory) 1207 and volatile RAM 1209 and a non-volatile memory 1211. The microprocessor 1205 may retrieve the instructions from the memories 1207, 1209, 1211 and execute the instructions to perform operations described above. The bus 1203 interconnects these various components together and also interconnects these components 1205, 1207, 1209, and 1211 to a display controller and display device 1217 and to peripheral devices such as input/output (I/O) devices which may be mice, keyboards, modems, network interfaces, printers and other devices which are well known in the art. In one embodiment, the system 1200 includes a plurality of network interfaces of the same or different type (e.g., Ethernet copper interface, Ethernet fiber interfaces, wireless, and/or other types of network interfaces). In this embodiment, the system 1200 can include a forwarding engine to forward network date received on one interface out another interface.

Typically, the input/output devices 1215 are coupled to the system through input/output controllers 1213. The volatile RAM (Random Access Memory) 1209 is typically implemented as dynamic RAM (DRAM), which requires power continually in order to refresh or maintain the data in the memory.

The mass storage 1211 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1211 will also be a random access memory although this is not required. While FIG. 12 shows that the mass storage 1211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1203 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 13:
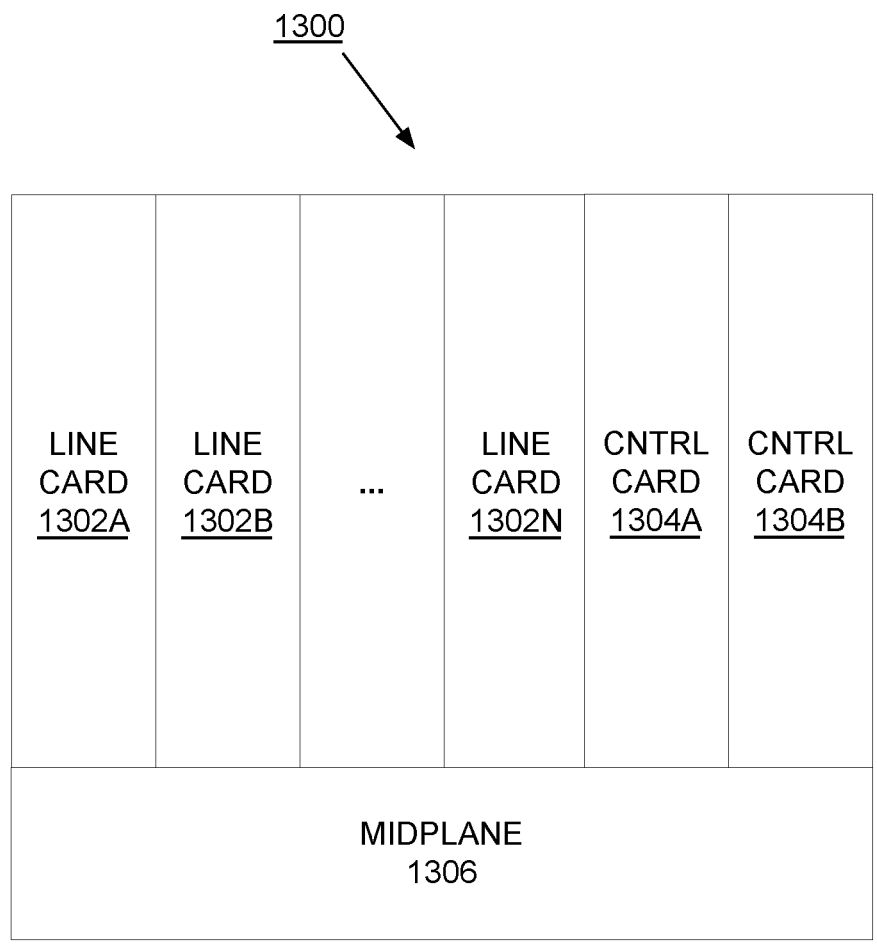
FIG. 13 is a block diagram of one embodiment of an exemplary network element that processes control plane data in a network element.

FIG. 13 is a block diagram of one embodiment of an exemplary network element 1300 that processes control plane data. In FIG. 13, the midplane 1306 couples to the line cards 1302A-N and controller cards 1304A-B. While in one embodiment, the controller cards 1304A-B control the processing of the traffic by the line cards 1302A-N, in alternate embodiments, the controller cards 1304A-B, perform the same and/or different functions (e.g., processes control plane failover as described in FIGS. 3-5 and/or handle fault detection in a LAG as described in FIGS. 6-8 above). In one embodiment, the line cards 1302A-N process and forward fault detection packets to the controller cards 1304A-B. It should be understood that the architecture of the network element 1300 illustrated in FIG. 13 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "detecting," "determining," "starting," "updating," "saving," "continuing," "transmitting," "processing," "setting," "marking," "configuring," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to continue a fault detection service for a link of a network element, the method comprising:
    starting a fault detection service for the link on each of a first supervisory component and a second supervisory component of the network element, wherein the first supervisory component sends fault detection packets on the link, the first supervisory component is active and the second supervisory component is standby, and a supervisory component is a component of the control plane that controls the processing of network data received by the network element;
    saving a state for the fault detection service of a second supervisory component; and
    in response to a failover of the first supervisory component to the second supervisory component, continuing the fault detection service of the second supervisory component based on the saved state and without indicating a detection of fault, wherein this fault detection service of the second supervisory component is active and sends fault detection packets on the link.

2. The machine-readable medium of claim 1, wherein the state of the fault detection service includes at least one of a type of data to send out, interval to send the data out, what interval to expect to receive the data, receive time-out parameter, and receive interval multiplier parameter.

3. The machine-readable medium of claim 1, further comprising:
    saving a state for the fault detection service of the first supervisory component.

4. The machine-readable medium of claim 1, wherein the second supervisory component is active after the failover.

5. The machine-readable medium of claim 1, wherein the fault detection service of the second supervisory component drops fault detection packets when this fault detection service is in a standby mode.

6. The machine-readable medium of claim 1, wherein the supervisory component is a supervisor card.

7. The machine-readable medium of claim 1, wherein the fault detection service is a bidirectional forwarding detection service.

8. The machine-readable medium of claim 7, wherein the bidirectional forwarding detection service is an asynchronous mode bidirectional forwarding detection service.

9. The machine-readable medium of claim 1, wherein the network element processes network data during the failover.

10. A method to continue a fault detection service for a link of a network element, the method comprising:
    starting a fault detection service for the link on each of a first supervisory component and a second supervisory component of the network element, wherein the first supervisory component sends fault detection packets on the link, the first supervisory component is active and the second supervisory component is standby, and a supervisory component is a component of the control plane that controls the processing of network data received by the network element;
    saving a state for the fault detection service of a second supervisory component; and
    in response to a failover of the first supervisory component to the second supervisory component, continuing the fault detection service of the second supervisory component based on the saved state and without indicating a detection of fault, wherein this fault detection service of the second supervisory component is active and sends fault detection packets on the link.

11. The method of claim 10, wherein the state of the fault detection service includes at least one of a type of data to send out, interval to send the data out, what interval to expect to receive the data, receive time-out parameter, and receive interval multiplier parameter.

12. The method of claim 10, further comprising:
    saving a state for the fault detection service of the first supervisory component.

13. The method of claim 10, wherein the second supervisory component is active after the failover.

14. The method of claim 10, wherein the fault detection service of the second supervisory component drops fault detection packets when this fault detection service is in a standby mode.

15. The method of claim 10, wherein the second supervisory component is a supervisor card.

16. The method of claim 10, wherein the fault detection service is a bidirectional forwarding detection service.

17. The method of claim 16, wherein the bidirectional forwarding detection service is an asynchronous mode bidirectional forwarding detection service.

18. The method of claim 10, wherein the network element processes network data during the failover.

19. A non-transitory machine-readable medium having executable instructions to cause one or more processing units to perform a method to continue a fault detection service for a link of a network element, the method comprising:
   starting a fault detection service for the link on a supervisory component of the network element, wherein the supervisory component sends fault detection packets on the link;
   saving a state for the fault detection service; and
   in response to an interruption of the fault detection service of the supervisory component, continuing the fault detection service with a second supervisory component of the network element based on the saved state and without indicating a detection of fault, wherein this fault detection service is active and sends fault detection packets on the link.

20. The non-transitory machine-readable medium of claim 19, wherein the interruption of service is selected from the group consisting of a reboot of the supervisory component and an upgrade to the supervisory component.

21. The non-transitory machine-readable medium of claim 19 wherein the second supervisory component is standby until the fault detection service of the supervisory component is continued on the second supervisory component.

22. A non-transitory machine-readable medium having executable instructions to cause one or more processing units to perform a method to continue a fault detection service for a link of a network element, the method comprising:
   starting a fault detection service for the link on a first supervisory component and a second supervisory component of the network element, wherein:
      the first supervisory component sends fault detection packets on the link; and
      the second supervisory component is standby and while standby does not send fault detection packets on the link;
   saving a state of the fault detection service of the first supervisory component; and
   in response to an interruption of the fault detection service of the first supervisory component, continuing the fault detection service with the second supervisory component active and based on the saved state without indicating a detection of fault, wherein when active the second supervisory component sends fault detection packets on the link.

23. The non-transitory machine-readable medium of claim 22, wherein the fault detection service of the second supervisory component drops fault detection packets when the second supervisory component is standby.

* * * * *